US007852021B2

(12) United States Patent
Yap et al.

(10) Patent No.: US 7,852,021 B2
(45) Date of Patent: Dec. 14, 2010

(54) METHOD AND APPARATUS FOR MINIMIZING FORCES ON A WEB

(75) Inventors: Anthony E. Yap, Southington, CT (US); Arthur H. DePoi, Brookfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 377 days.

(21) Appl. No.: 11/964,079

(22) Filed: Dec. 26, 2007

(65) Prior Publication Data

US 2009/0165622 A1 Jul. 2, 2009

(51) Int. Cl.
*H02P 7/08* (2006.01)

(52) U.S. Cl. .............................. 318/66; 318/55; 318/59

(58) Field of Classification Search ................... 318/66, 318/55, 59

See application file for complete search history.

(56) References Cited

U.S. PATENT DOCUMENTS 5,404,289 A * 4/1995 Hang et al. ................... 700/55
5,735,205 A * 4/1998 Nordgren .................... 101/181
5,813,587 A * 9/1998 Nordgren ...................... 226/29
6,053,107 A * 4/2000 Hertel et al. ................ 101/490
6,588,641 B2 * 7/2003 Prittie ..................... 226/118.3
6,697,767 B2 * 2/2004 Wang et al. ................. 702/189
6,698,681 B1 * 3/2004 Guy et al. .................... 242/534
6,968,254 B2 * 11/2005 Tochigi et al. .............. 700/122
7,181,295 B2 * 2/2007 Yu et al. ........................ 700/42
7,404,349 B1 * 7/2008 Fiske et al. ................... 83/236

* cited by examiner

*Primary Examiner*—Walter Benson
*Assistant Examiner*—David S Luo
(74) *Attorney, Agent, or Firm*—Michael J. Cummings; Angelo N. Chaclas

(57) ABSTRACT

A method of controlling a web in, for example, a web cutter that minimizes the destructive forces that are experienced by the web. The method includes providing a motor system for driving a web handling mechanism structured to move the web, wherein the motor system includes a motor and a motor control subsystem having a digital filter (such as a PID controller or some other suitable closed loop controller), detuning the digital filter, and using the motor system having the detuned digital filter to drive the web handling mechanism.

19 Claims, 5 Drawing Sheets

METHOD AND APPARATUS FOR MINIMIZING FORCES ON A WEB

FIELD OF THE INVENTION

The present invention relates to paper handling systems and, in particular, to a method and apparatus for minimizing the destructive forces on a web in, for example, the web cutter of an inserter system.

BACKGROUND OF THE INVENTION

Inserter systems are typically used by organizations such as banks, insurance companies and utility companies for producing a large volume of specific mailings where the contents of each mail item are directed to a particular addressee. In many respects, a typical inserter system resembles a manufacturing assembly line. Sheets and other raw materials (e.g., enclosures and envelopes) enter the inserter system as inputs. Then, a plurality of different modules or workstations in the inserter system work cooperatively to process sheets until a finished mail piece is produced. Typically, inserter systems prepare mail pieces by gathering collations of documents on a conveyer. The collations are then transported on the conveyer to an insertion station where they are automatically stuffed into envelopes. After being stuffed with the collations, the envelopes are removed from the insertion station for further processing, such as automated closing and sealing of the envelopes, weighing of the envelopes, applying postage to the envelopes, and finally sorting and stacking the envelopes.

At the input end of a typical inserter system, rolls or stacks of continuous printed documents, called a web, are fed into the inserter system by a web feeder. As will be appreciated, the continuous web must be separated into individual document pages. This separation is typically carried out by a web cutter that uses a blade forming a part of guillotine cutting module to cut the continuous web into individual document pages. In one type of web cutter, the web is provided with sprocket holes on both sides thereof and is fed from a fanfold stack or a roll into the web cutter. The web cutter has a tractor with pins or a pair of moving belts with sprockets to move the web toward the guillotine cutting module for cutting the web cross-wise into separate sheets. Perforations are provided on each side of the web so that the sprocket hole sections of the web can be removed from the sheets prior to moving the cut sheets to other components of the inserter system. In an alternative type of web cutter, the continuous web is moved by a pair of control nips. Such a system is referred to as a pinless cutter because the web drive arrangement does not utilize drive tractors or belts having pins to advance a web having sprocket holes, as described above.

In the feed cycle of a web cutter, the web is advanced past the blade of the guillotine cutting module by a distance equal to the desired length of the cut sheet and is stopped. In the cut cycle of a web cutter, the blade lowers to shear off the sheet of paper, and then withdraws from the web. As soon as the blade withdraws from the web path, the next feed cycle begins. The feed and cut cycles are carried out in such an alternate fashion over the entire operation.

FIG. 1 is a schematic diagram of a portion of a prior art web cutter 5 that includes a cutter portion 10 and a web handler portion 15. As seen in FIG. 1, the cutter portion 10 includes a blade 20 for cutting the web 25 in the manner just described and a motor driven tractor set 30 for feeding the web 25 (received from a paper source (not shown)) to the blade 20 in cooperation with the web handler portion 15, described below. Throughput performance of existing web cutters such as the web cutter 10 is typically limited by the forces experienced by the web 25 just upstream of the blade 20, as well as forces experienced by the web 25 at the point of entry of the web 25 into the web cutter 5 from the paper source. For a given level of cut frequency, the period between consecutive cuts is a constant length of time and is generally comprised of an advance or feed web time added serially to a cut web time. Although some overlap between these two times is permissible, for more reliable paper control, the web 25 may be kept at rest from the time when the blade 20 actually starts cutting the web 25 to the time that the blade 20 has fully retracted to clear the web 25.

In order to accommodate the steady state stopping and starting of the web 25 at the cutter portion 10, which is paired with an upstream module that is typically delivering the web 25 from the paper source at a constant velocity, the web handler portion 15 is provided, which serves as a control loop. In particular, the web handler portion 15 includes a low mass dancer roller 35, which is loaded against the web 25 by a light spring (not shown) for keeping the web 25 taut. In addition, the web handler portion 15 may also include an upstream urge device 40 to help to pull the web 25 from the paper source. It is at the location of the dancer roller 35 where the web 25 typically breaks due to the snap action of the web 25 on the dancer roller 35. This snap action of the web 25 is created by the dancer roller 35 translating downward as the web 25 at the cutter portion 10 accelerates upward. The breakage of the web 25 at this point can be attributed largely to the mass of the dancer roller 35. However, a limitation of the dancer roller 35 is that its finite mass cannot be practically lowered further because it is required to span the entire web 25, while preserving structural integrity.

FIG. 2 is a schematic diagram of an alternative web cutter 50. The web cutter 50 includes a blade 55 for cutting a web 70, and a motor-driven primary web drive 60 that works cooperatively with a motor-driven web handling mechanism 65 for feeding the web 70 (received from a paper source (not shown)) to the blade 55. In addition, the web cutter 50 includes a vacuum box 75 for keeping the web 70 taut. During steady state operation, the primary web drive 60 executes a rapid start and stop motion profile with accelerations typically exceeding 40 G's for 36,000 cuts per hour operation with a 12-inch cut sheet length output. The period for such operation is 100 ms. Also during steady state operation, the web handling mechanism 65 operates at a constant velocity, but during stoppages (e.g., cutting operations), the web handling mechanism 65 is designed to execute with low accelerations. The web handling mechanism 65 may be used in conjunction with a high capacity vacuum box 75 capable of containing roughly 1 meter of the web 70. In that arrangement, the web 70 may undergo accelerations upstream of the vacuum box 75 that generally do not exceed 0.5 G's.

Notwithstanding the improved performance provided by the web cutter 50, breakages of the web 70 may sometimes occur near the entrance of the web cutter 50 even when the drive elements of the web handling mechanism 65 operate at constant velocity. That condition may be aggravated when a cart (not shown) is utilized to hold a fan-folded stacked paper source (i.e., as compared to a fan-folded stack resting on the floor or a roll unwinder, which may also be used). In particular, translating the web 70 up and over rollers and/or turn bars to clear the cart to deliver the web 70 to the entrance of the cutter 50 may result in high nominal forces on the web 70 and more susceptibility to breaks in the web 70 due to force disturbances, which can either be external to the system (e.g., air resistance) or internal to the system (e.g., stoppages of the web cutter 50). These force disturbances are superimposed on the already high nominal tensions of the web 70.

In addition, it has been observed that when a cart is employed for the paper source, every other fan-folded panel of the web 70 resulted in high peak instantaneous motor torques associated with the web handling mechanism 65 in order to maintain the web 70 at constant velocity. It is speculated that the high forces introduced for every other panel are due to a low pressure zone generated between a stationary wall that is located in the center of the conventional carts and a panel that is being rapidly pulled away from such a wall. This effect is illustrated in FIG. 3, which is a plot of relative torque commanded to an amplifier that drives the motor that is coupled to the web handling mechanism 65 (Y-axis) versus time in seconds (X-axis). As seen in FIG. 3, each torque peak is spaced by two panel lengths. Neglecting the effect of motor rotor and drive mechanism inertia, the plot shown in FIG. 3 provides an accurate representation of the instantaneous tensile forces on the web 70 observed in one arrangement.

SUMMARY OF THE INVENTION

In one embodiment, the invention provides a method of controlling a web that includes providing a motor system for driving a web handling mechanism structured to move the web, wherein the motor system includes a motor and a motor control subsystem having a digital filter (such as a PID controller or some other suitable closed loop controller), detuning the digital filter, and using the motor system having the detuned digital filter to drive the web handling mechanism. The detuning of the digital filter reduces peak forces (at the expense of larger position error) and therefore reduces web breakages. The digital filter typically employs one or more coefficients. In one embodiment, when the digital filter is tuned, the one or more coefficients each have a respective first value. The step of detuning the digital filter includes causing each of one or more of the coefficients to have a respective second value that is different than the respective first value of the coefficient. The step of detuning the digital filter may include causing at least one of the one or more of the coefficients to have a respective second value that is lower than the respective first value of the coefficient, or causing each of the one or more of the coefficients to have a respective second value that is lower than the respective first value of the coefficient. The web handling mechanism may be a web handling tractor set, or, alternatively, a plurality of control nips.

In another embodiment, the invention provides an apparatus for controlling a web that includes a web handling mechanism structured to move the web, and a motor system for driving the web handling mechanism, wherein the motor system includes a motor and a motor control subsystem having a detuned digital filter.

In one particular embodiment, the invention provides a web cutter for cutting a web that includes a blade for selectively cutting the web, a web handling mechanism structured to selectively move the web toward the blade, and a motor system for driving the web handling mechanism, wherein the motor system includes a motor and a motor control subsystem having a detuned digital filter. The web cutter may further include a second web handling mechanism structured to selectively move the web toward the blade and a vacuum box located between the web handling mechanism and the second web handling mechanism that is structured to keep the web taut.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings illustrate exemplary embodiments of the invention, and together with the general description given above and the detailed description given below, serve to explain the principles of the invention. As shown throughout the drawings, like reference numerals designate like or corresponding parts.

DESCRIPTION OF EXEMPLARY EMBODIMENTS

The present invention provides a method and apparatus for minimizing the destructive forces that are experienced by a web in a paper handling system by detuning a digital filter (described below) that outputs a commanded instantaneous torque to a motor that drives a web handling mechanism. For illustrative purposes, the present invention will be described as implemented in the web cutter 50 shown in FIG. 2. It should be understood that this is meant to be exemplary only, and should not be considered to be limiting, as the present invention may be implemented in web cutters or other paper handling systems having different configurations and/or components than those shown in FIG. 2.

Figure 1:
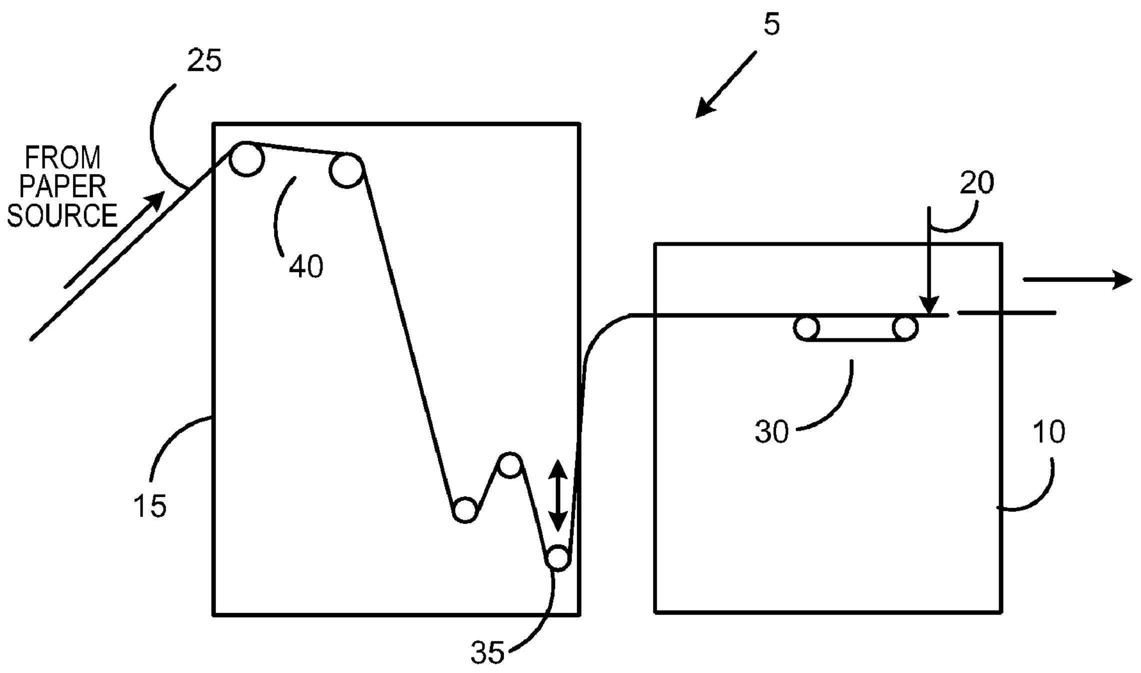
FIG. 1 ( PRIOR ART )
FIG. 1 is a schematic diagram of a portion of a conventional web cutter.
Figure 2:
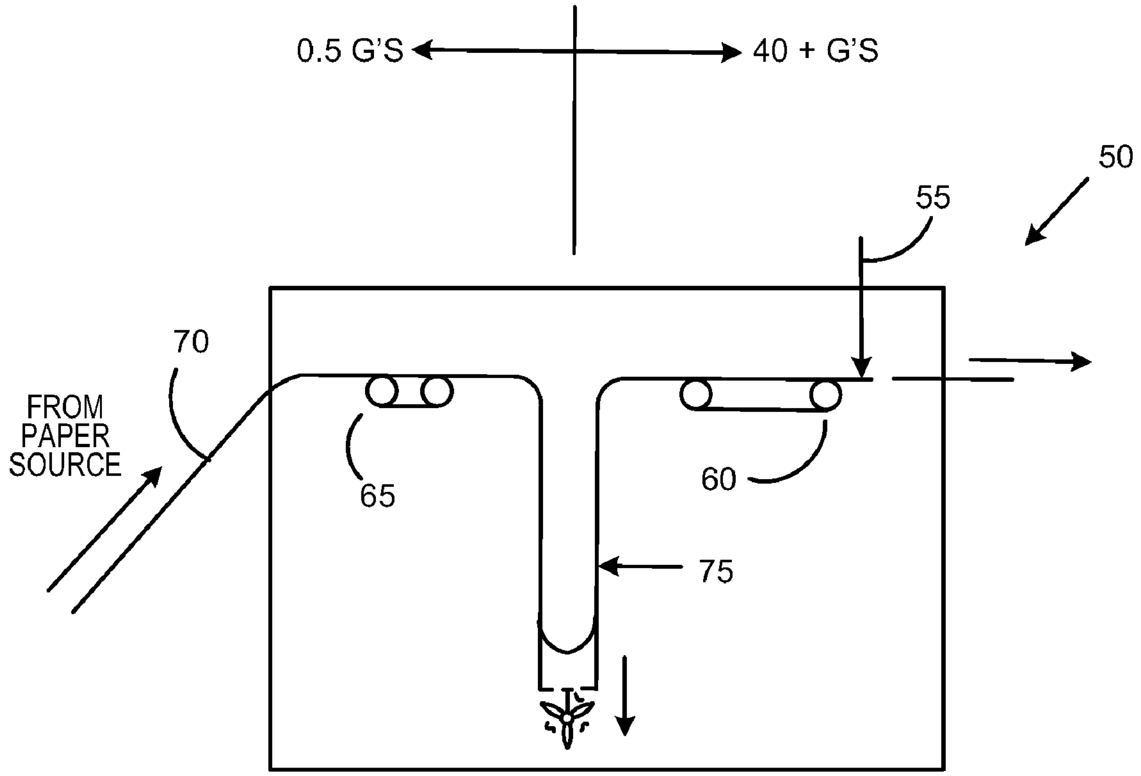
FIG. 2 is a schematic diagram of an alternative web cutter 50.
Figure 4:
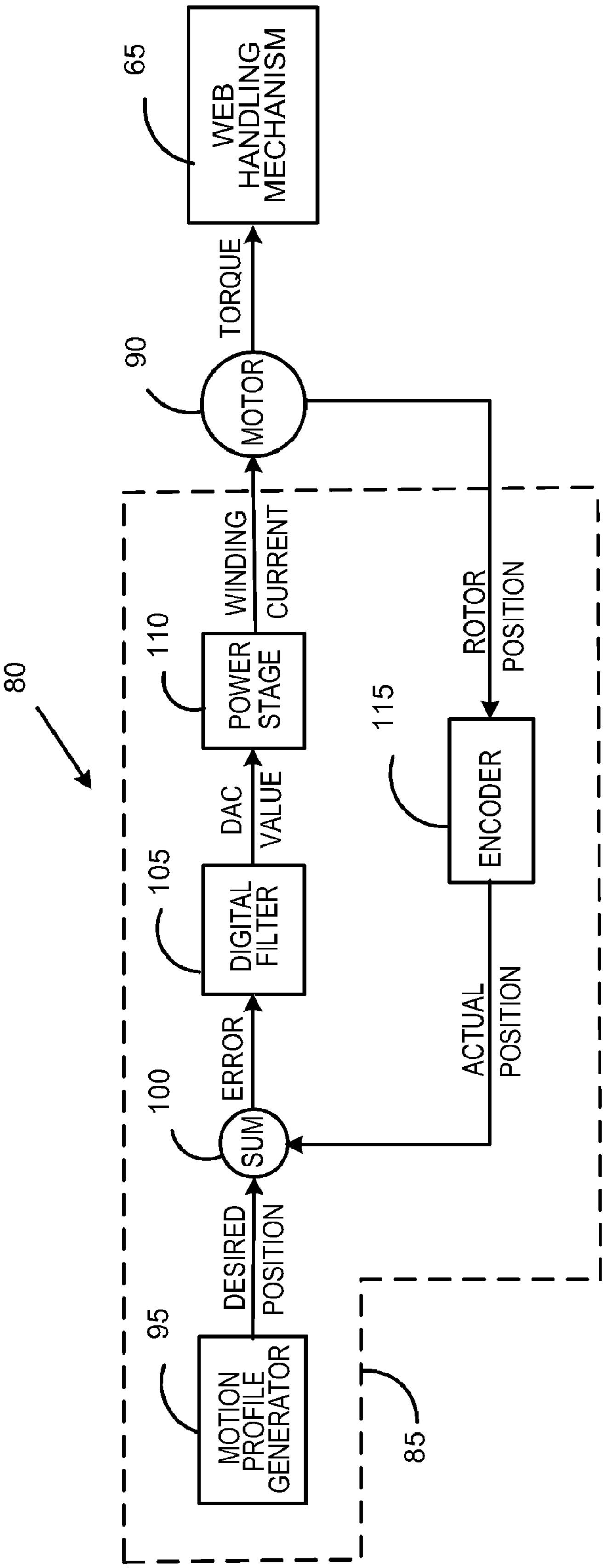
FIG. 4 is a block diagram of a motor system that may, in one embodiment, be used to implement the present invention in the web cutter of FIG. 2.

FIG. 4 is a block diagram of a motor system 80 that may, in one embodiment, be used to implement the present invention in the web cutter 50 of FIG. 2. As seen in FIG. 4, the motor system 80 includes a motor control subsystem 85 which, as described in greater detail below, controls the operation of an electric motor 90, which in turn outputs a torque that drives the web handling mechanism 65. The motor 90 is what is commonly referred to as a servo motor. A servo motor, as that term is used herein, refers to a motor that is controlled based on a closed feedback loop, wherein the feedback is in the form of some motion parameter or attribute of the motor such as rotor position (i.e., angular position), rotor velocity, or rotor acceleration.

As seen in FIG. 4, the motor control subsystem 85 includes a motor profile generator 95, a summing junction 100, a digital filter 105, a power stage 110, and an encoder 115. The motion profile generator 95 generates and outputs a motion profile which is designed to selectively control the angular velocity of the rotor of the motor 90 in order to output a desired torque by controlling the angular position of the rotor over some period of time. In particular, in the embodiment shown in FIG. 4, at some periodic rate (e.g., every 500 microseconds), the motion profile generator 95 injects a desired rotor position into the summing junction 100. The actual rotor position of the motor 90, as provided by the encoder 115 as described below, is subtracted from the desired position to provide a position error. The position error is injected into the digital filter 105 which in turn outputs a DAC (digital to analog converter) value that is proportional to the desired instantaneous torque.

In one embodiment, the digital filter 105 is a PID (proportional, integral, derivative) controller. It should be appreciated, however, that the digital filter 105 may be based on any suitable algorithm that converts position error into a DAC value that gets injected into the power stage 110 (also referred to as an amplifier or drive). For example, the digital filter 105 may be a PI (proportional, integral) controller, a lead/lag controller, or some other suitable closed loop controller.

The output of the power stage 110 is typically electrical current (but can be a voltage) that is provided to the motor 90 that ultimately provides the desired quality of motion at the web handling mechanism 65. The DAC value is scaled accordingly to match the inputs and outputs of the power stage 110. For example, many commercially available amplifiers use ±10 VDC as an acceptable analog input signal. The power stage 110 converts this input signal into and outputs a winding current that is proportional to the input signal. In lieu of an analog output, the digital filter 105 may output a digital value whereby the power stage 110 can accept this digital value and accomplish the same as the analog version.

The winding current is delivered to the motor 90 and is proportional to the desired output torque of the motor 90. This ultimately provides the desired motion to the web handling mechanism 65. An encoder 115, or other suitable feedback device, is located somewhere on the motor shaft of the motor 90 or on the driven mechanism and provides the actual rotor position of the motor 90 back to the summing junction 100, completing the outer closed loop (the control loop within the power stage 110 is commonly referred to as the inner loop).

As is known in the art, a PID controller is a generic control loop feedback mechanism widely used in industrial control systems. A PID controller attempts to correct the error between a measured process variable and a desired set point by calculating and then outputting a corrective action that can adjust the process accordingly. The PID controller calculation (i.e., algorithm) involves three separate parameters: the proportional, the integral, and the derivative values. The proportional value determines the reaction to the current error, the integral value determines the reaction based on the sum of recent errors, and the derivative value determines the reaction to the rate at which the error has been changing. The weighted sum of these three actions, based on a coefficient associated with each one, is used to adjust the process via a control element, such as the rotor position of a motor like motor 90.

Figure 3:
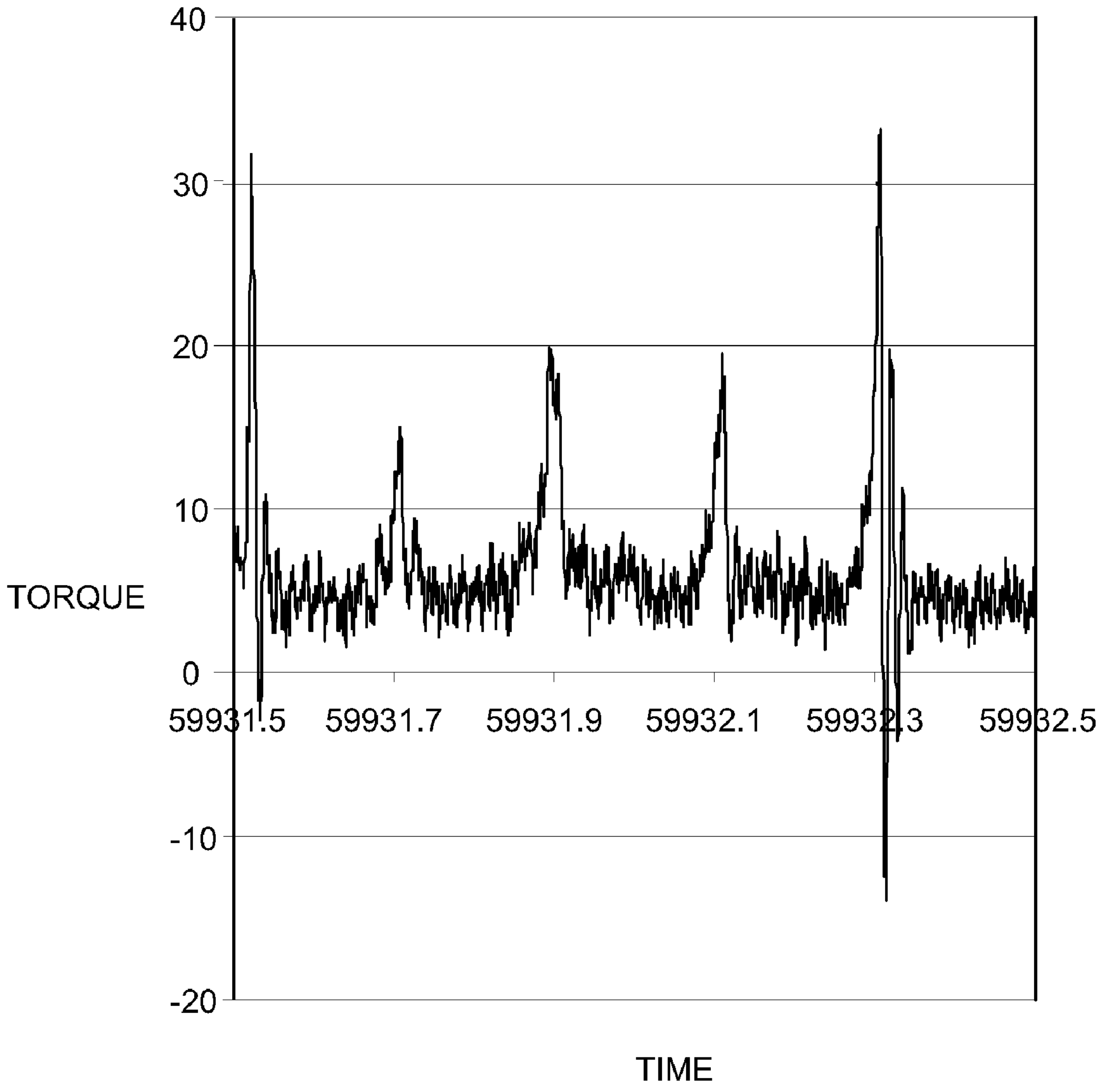
FIG. 3 is a plot of relative torque versus time during exemplary operation of the web cutter of FIG. 2 according to conventional methods.

By tuning the three coefficients in the PID controller algorithm, the PID controller can provide control action designed for specific process requirements. In particular, as used herein, the term tuning or tuned in the case of a digital filter, such as a PID controller or other closed loop controller, shall mean that the coefficients of the controller algorithm implemented in the digital filter are chosen so as to minimize the error, e.g., position error, for a desired parameter, e.g., desired motion profile, while keeping the system stable. Normally, the digital filter 105 of the motor system 80 would be tuned so that position error is minimized. However, as discussed elsewhere herein, under certain conditions tuning the digital filter 105 causes high peak instantaneous motor torques associated with the web handling mechanism 65 (as shown in FIG. 3), which leads to breakages of the web 70 at the entrance to the web cutter 50.

The present invention may reduce or eliminate this problem by detuning the digital filter 105. Specifically, in one embodiment of the invention, the digital filter 105 is detuned by lowering one or more of, and in some embodiments all of, the coefficients of the controller algorithm implemented in the digital filter 105 (e.g., the PID coefficients) from the values of such coefficients that would cause the digital filter 105 to be tuned (i.e., the coefficient values that would minimize the position error for a desired motion profile while keeping the system stable). As used herein, the term detuning or detuned in the case of a digital filter, such as a PID controller or other closed loop controller, shall mean that one or more of the coefficients of the controller algorithm implemented in the digital filter are chosen so as to be different than the coefficient value or values that would minimize the error, e.g., position error, for a desired parameter, e.g., desired motion profile, while keeping the system stable.

Figure 5:
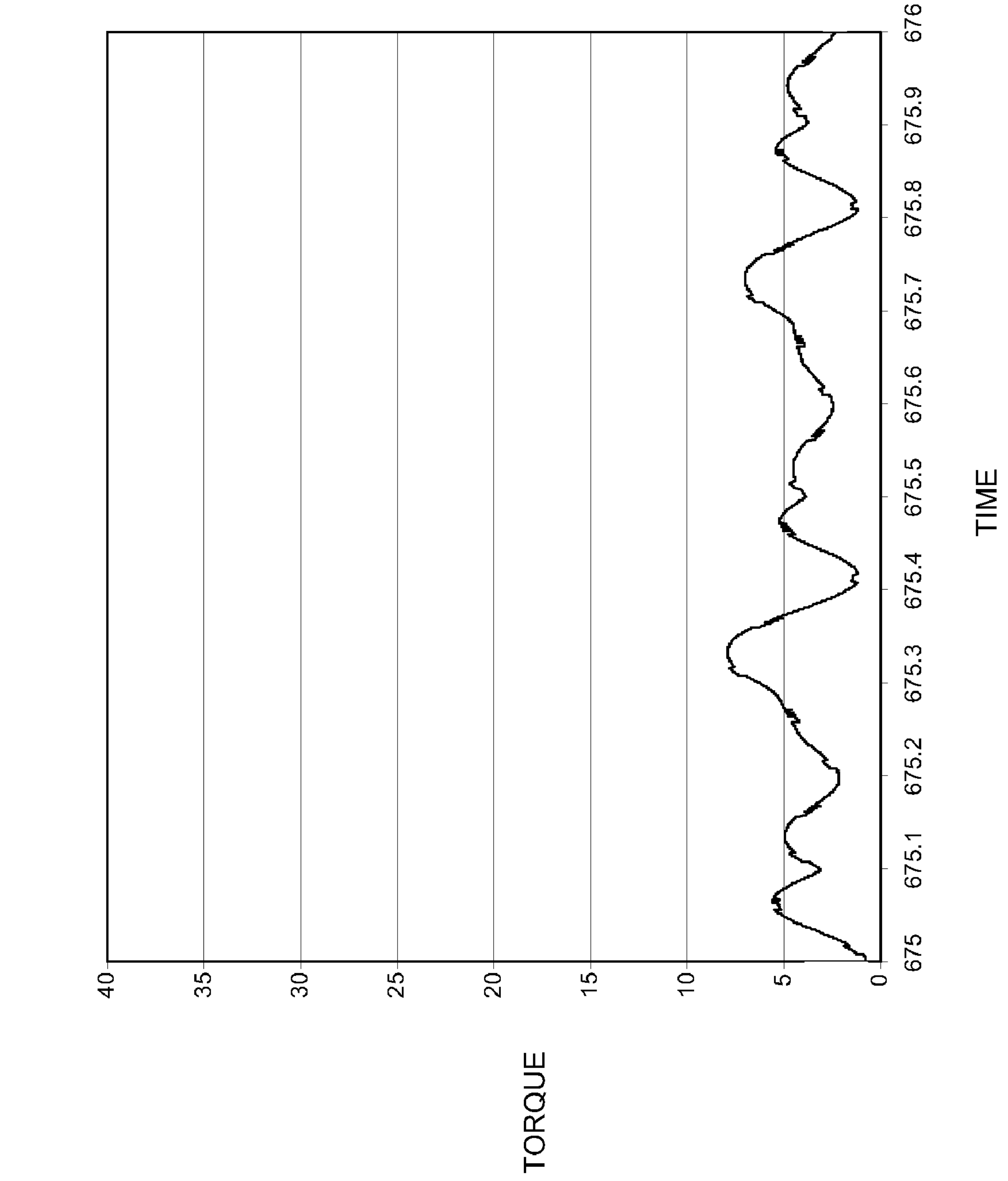
FIG. 5 is a plot of relative torque versus time during exemplary operation of the web cutter of FIG. 2 according to an embodiment of the present invention.

When the digital filter 105 is detuned in this manner, the response of the motor system 80 will be reduced, which allows position error to grow. As a result, as shown in FIG. 5, peak forces are reduced (e.g., on the order of a factor of 5) at the expense of larger position error. This larger position error may be compensated for in the web cutter 50 by the high capacity vacuum box 75 that can store up to one meter or more of paper. The reduction in peak forces in turn reduces the occurrences of breakage of the web 70.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. A method of controlling a web to reduce tensile loads acting on the web material, comprising:

providing a motor system for driving a web handling mechanism structured to move the web, the motor system comprising a motor and a motor control subsystem having a digital filter, detuning the digital filter; and using the motor system having the detuned digital filter to drive the web handling mechanism such that torque loads produced by the motor and the tensile loads acting on the web material are reduced.

2. The method according to claim 1, wherein the digital filter employs one or more coefficients, wherein when the digital filter is tuned, the one or more coefficients each have a respective first value, and wherein the step of detuning the digital filter comprises causing each of one or more of the coefficients to have a respective second value that is different from the respective first value of the coefficient.

3. The method according to claim 2, wherein detuning the digital filter comprises causing at least one of the one or more of the coefficients to have a respective second value that is lower than the respective first value of the coefficient.

4. The method according to claim 3, wherein detuning the digital filter comprises causing each of the one or more of the coefficients to have a respective second value that is lower than the respective first value of the coefficient.

5. The method according to claim 1, wherein the digital filter comprises a PIP controller.

6. The method according to claim 1, wherein the web handling mechanism comprises one of a web handling tractor set and a plurality of control nips.

7. An apparatus for controlling a web to reduce tensile loads acting on the web material, comprising:

a web handling mechanism structured to move the web;

a motor system for driving the web handling mechanism, the motor system comprising a motor and a motor control subsystem having a detuned digital filter for reducing torque loads produced by the motor, the reduced torque loads reducing the tensile loads acting on the web material.

8. The apparatus according to claim 7, wherein the digital filter employs one or more coefficients, wherein when the digital filter is tuned, the one or more coefficients each have a respective first value, and wherein in the detuned digital filter, each of one or more of the coefficients has a respective second value that is different than the respective first value of the coefficient.

9. The apparatus according to claim 8, wherein at least one of the one or more of the coefficients has a respective second value that is lower than the respective first value of the coefficient,

10. The apparatus according to claim 9, wherein at least one of the one or the coefficients has a respective second value that is lower than the respective first value of the coefficient.

11. The apparatus according to claim 7, wherein the digital filter comprises a PID controller.

12. The apparatus according to claim 7, wherein the web handling mechanism comprises one of a web handling tractor set and a plurality of control nips.

13. A web cutter for cutting a web material, comprising:

a blade for selectively cutting the web material;

a web handling mechanism structured to selectively move the web toward the blade; and a motor system for driving the web handling mechanism, the motor system including a motor and a motor control subsystem having a detuned digital fitter for reducing torque loads produced by the motor the reduced to torque loads reducing the tensile loads acting on the web material.

14. The web cutter according to claim 13, further comprising:

a primary web drive structured to selectively move the web toward the blade; and a vacuum box located between the web handling mechanism and the primary web drive that is structured to keep the web taut.

15. The web cutter according to claim 13, wherein the digital filter employs one or more coefficients, wherein when the digital filter is tuned, the one or more coefficients each have a respective first value, and wherein in the detuned digital filter, each of one or more of the coefficients has a respective second value that is different than the respective first value of the coefficient.

16. The web cutter according to claim 15, wherein at least one of the one or more of the coefficients has a respective second value that is lower than the respective first value of the coefficient.

17. The web cutter according to claim 16, wherein each of the one or more of the coefficients has a respective second value that is lower than the respective first value of the coefficient.

18. The web cutter according to claim 13, wherein the digital filter comprises a PID controller.

19. The web cutter according to claim 13, wherein the web handling mechanism comprises one of a web handling tractor set and a plurality of control nips.

* * * * *